(12) United States Patent
Bigolin et al.

(10) Patent No.: US 9,957,009 B2
(45) Date of Patent: *May 1, 2018

(54) SUPPORT ELEMENT FOR THE HUMAN BODY

(71) Applicant: Selle Royal S.p.A., Pozzoleone (Vincenza) (IT)

(72) Inventors: Barbara Bigolin, Pozzoleone (IT); Claudio Checchin, Pozzoleone (IT); Marco Malfatti, Pozzoleone (IT)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/031,119

(22) PCT Filed: Oct. 20, 2014

(86) PCT No.: PCT/IB2014/065473
§ 371 (c)(1),
(2) Date: Apr. 21, 2016

(87) PCT Pub. No.: WO2015/059624
PCT Pub. Date: Apr. 30, 2015

(65) Prior Publication Data
US 2016/0257364 A1    Sep. 8, 2016

(30) Foreign Application Priority Data
Oct. 21, 2013    (IT) .............................. VR2013A0231

(51) Int. Cl.
*B62J 1/20*    (2006.01)
*B62J 1/00*    (2006.01)
(Continued)

(52) U.S. Cl.
CPC . *B62J 1/20* (2013.01); *B62J 1/00* (2013.01); *B62J 1/18* (2013.01); *B62J 1/22* (2013.01); *B62J 9/006* (2013.01)

(58) Field of Classification Search
CPC ......... B62J 1/00; B62J 1/18; B62J 1/20; B62J 1/22; A47C 7/021; B60N 2/7005; B60N 2/72
See application file for complete search history.

(56) References Cited

U.S. PATENT DOCUMENTS 5,765,912 A * 6/1998 Bontrager ................... B62J 1/22
                                                        297/201
6,039,396 A * 3/2000 Muser ........................ B62J 1/18
                                                      297/195.1

(Continued)

FOREIGN PATENT DOCUMENTS

| | | |
|---|---|---|
| EP | 2052955 | 4/2009 |
| WO | 2007/031943 | 3/2007 |
| WO | 2007/034422 | 3/2007 |

*Primary Examiner* — Philip F Gabler
(74) *Attorney, Agent, or Firm* — Tutunjian & Bitetto, P.C.

(57) ABSTRACT

The present invention relates to a support element for the human body, including a padding component and a base component or body, the base component including an upper, in use, surface, as well as a lower, in use, surface, the padding component includes an upper, in use, surface, and a lower, in use, surface designed to engage the upper, in use, surface of the base component, the support element including removable anchoring means of the base component to the padding component.

20 Claims, 10 Drawing Sheets

(51) Int. Cl.
*B62J 1/18* (2006.01)
*B62J 1/22* (2006.01)
*B62J 9/00* (2006.01)

(56) References Cited

U.S. PATENT DOCUMENTS

| | | | | |
|---|---|---|---|---|
| 6,827,397 | B1* | 12/2004 | Driver | B62J 1/10 |
| | | | | 297/215.14 |
| 7,059,673 | B1* | 6/2006 | Lee | B62J 1/00 |
| | | | | 297/195.1 |
| 7,547,064 | B2* | 6/2009 | Garneau | B62J 1/00 |
| | | | | 297/195.1 |
| 7,651,162 | B2* | 1/2010 | Segato | B62J 1/00 |
| | | | | 297/195.1 |
| 7,717,505 | B2* | 5/2010 | Yu | B62J 1/00 |
| | | | | 297/202 |
| 2006/0033250 | A1* | 2/2006 | Lobry | A47C 23/002 |
| | | | | 267/142 |

* cited by examiner

SUPPORT ELEMENT FOR THE HUMAN BODY

TECHNICAL FIELD OF THE INVENTION

The present invention relates to a support element for the human body, such as a saddle for a vehicle, for example a bicycle, a motorcycle or other vehicle.

STATE OF THE PRIOR ART

Many saddles for bicycles have been proposed as of today, optionally also provided with a so-called ICS (Integrated clip system) component, that is to say a component delimiting a groove or the like for engaging or anchoring a fitting, such as a bag, to the saddle.

Saddles provided with a body, usually directly fixable or constrainable to the frame of a bicycle, and a padding fixed to the body and made of a softer material than that of the body, have also been proposed.

However, the saddles proposed so far are less easy to assemble and the respective assembly methods are very laborious.

Moreover the provision of an ICS with said saddles is difficult and expensive.

WO2007031943A1, EP2052955A2 and WO2007034422A1 teach saddles according to the state of the art.

SUMMARY OF THE INVENTION

The technical task of the present invention is therefore to improve the state of the art, by conceiving a support element for the human body, such as a saddle lacking the above drawbacks.

Within the scope of said technical task, an object of the present invention is to conceive a saddle that is easily and rapidly assembled and interchanged.

Another object of the present invention is to provide a saddle that is easily and reliably assembled.

A further object of the present invention is to provide a saddle to which it is possible to stably anchor or constrain one or more fittings.

A further object of the present invention is to provide a saddle in which it is possible to avoid or in any case limit the damages caused by vandalism and theft.

Another object of the present invention is to provide a saddle in which it is possible to easily replace worn or damaged parts, thus making it more environmentally friendly.

In accordance with an aspect of the invention, a support element according to the present principles is provided.

The present application refers to preferred and advantageous embodiments of the invention.

BRIEF DESCRIPTION OF THE DRAWINGS

Other features and advantages of the invention will be clearer from the description of embodiments of a support element, illustrated by way of indication in the accompanying drawings in which.

In the accompanying drawings identical parts or components are identified by the same reference numbers.

DETAILED DESCRIPTION OF EMBODIMENT OF THE INVENTION

Figure 1:
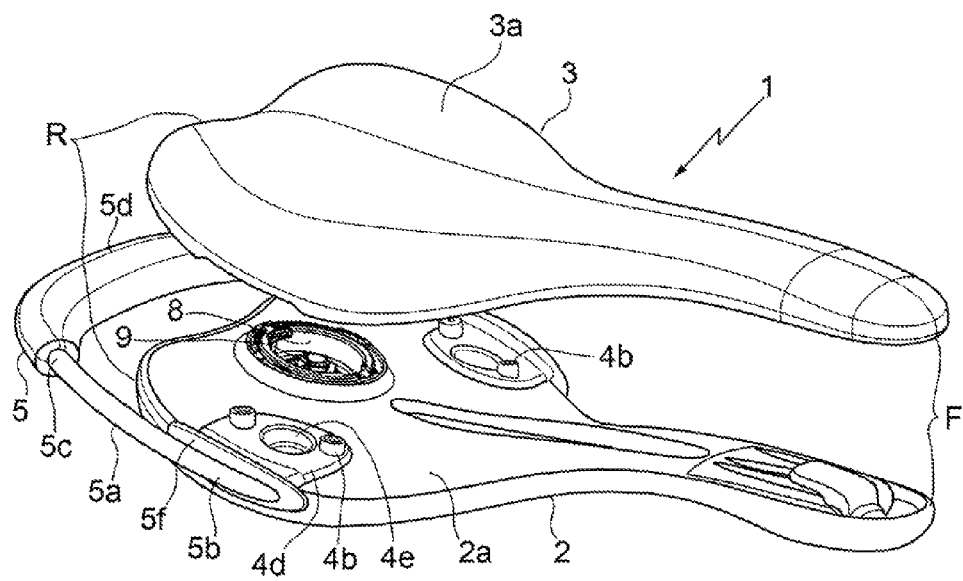
FIG. 1 is an exploded perspective view slightly from above of the components of a saddle according to the present invention.

With reference to the Figures, a support element 1 for the human body, such as a saddle for a vehicle, for example a bicycle or a motorcycle, has been illustrated.

The support element 1 comprises a base component or body 2, for example constrainable to the frame of a bicycle or a motorcycle, and a padding component 3. When the support element 1 is a saddle for bicycles, as is known, between the base component 2 and the frame, a so-called "rail" or fork component could be interposed, usually comprising a U-shaped component formed by a pair of bars or tines connected at an end.

The base component 2 comprises an upper or inner, in use, surface 2a, as well as a lower or outer, in use, surface 2b, while the padding component 3 comprises an upper or outer, in use, surface 3a and a lower or inner, in use, surface 3b intended to engage the upper, in use, surface 2a of the base component or body 2, for example by overlapping or coming into contact with the surface itself.

The surfaces 2a and 2b of the base component 2 and the surfaces 3a and 3b of the padding component 3 have a substantially matching and/or complementary shape.

Preferably, the upper surface 2a of the base component 2 is substantially configured like the lower surface 3b of the padding component 3, so that the same, once the support element 1 has been assembled, are engageable or abuttable against each other for their entire extension.

If the support element 1 is a saddle, then the upper surface 3a of the padding 3 is, preferably, substantially free and intended to constitute the sitting surface for a user. In this regard, the padding component 3 can also be covered in whole or in part by a covering for example made of leather, or other natural or synthetic material.

Preferably, the padding component 3 is made of a soft material and in particular softer than the base component 2. For example the padding can be made of a material such as a polyurethane foam, an elastomeric material or the like.

Moreover, one or more inserts can be embedded in the padding component 3, having softness, elasticity and/or color and/or physical or viscoelastic properties different from the padding component 3.

The padding component 3 can also have a base made of rigid material, for example plastic on which a foam or a softer material can be applied.

The support element 1 then comprises removable anchoring means of the base component 2 to the padding component 3, so that it is possible to easily and rapidly assemble and disassemble the base component 2 and the padding component 3.

Preferably, the support element 1 according to the present invention comprises engagement means 4a, 4b, 4e of a fitting, such as a handle 5 (see in particular FIG. 1) or protection components 50 and/or the like, engagement means which are intended to act or operate between the base component or body 2 and the padding component 3 or better in the area between the upper surface 2a of the base component 2 and the lower surface 3b of the padding component 3. The fitting can comprise as stated above, a handle, a protection component, a light or other element.

The engagement means can, for example, comprise one or more first holes or engagement openings 4a, that are through or not through holes or openings, formed in the base component 2 or in the padding component 3 and also include one or more screw or bolt elements 4b or coupling elements each engageable in a respective first hole or engagement opening 4a so as to fix the fitting 5 or 50 to the base component 2 or the padding component 3. The fixing of the fittings can also be obtained through self-tapping screws engageable in the opening 4a.

Moreover, a housing seat 6 can be provided in the padding component 3 or in the base component 2, for the head 4c of the screw or bolt 4b inserted into a first engagement opening 4a in the other between the base component 2 and the padding component 3; the main development body (not visible in the Figures) of the screw or bolt 4b is instead removably insertable, for example by screwing into a respective hole or opening 4a.

A support element according to the present invention comprises, preferably, a fitting 5 including a rod or stem component 5a or protruding portion having a first end 5b engageable through the engagement means 4a, 4b to the base component 2 or to the padding component 3 and the other or second end 5c extending outside of or in any case distal to the area between the upper surface 2a of the base component 2 and the lower surface 3b of the padding component 3. The rod or stem component 5a or protruding portion can be shaped in a manner different from that shown in the Figures.

With particular reference to the embodiment illustrated in FIG. 1, the fitting comprises a substantially U-shaped handle 5 which thus has two rods or stems 5a bridged through a connection element 5d.

The handle 5 can be covered with a soft grip element.

The base component 2 can then be provided with attachment means for a fork component or rail RA (see FIG. 25), preferably at its lower surface 2a, for example two projecting blocks 2c at the rear of the base component 2 delimiting respective openings for a length of the fork RA and a seat 2d at the front of the base component 2 for inserting the tip or tips of the rail RA.

In a version of the invention, the end 5b of each rod 5a can be fixed (for example glued or welded) to a plate 4d in which one or more second engagement openings 4f are provided (see in particular FIGS. 7 and 8) that can each be aligned with a respective hole or engagement opening 4a in the base component 2 or in the padding component 3. After such alignment step a bolt or screw 4b is inserted into the openings (4a as well as 4f) thus aligned, thereby fixing each plate 4d, and then the respective rod 5a and the fitting 5 or 50, to the base component 2 or the padding component 3.

In a further version of the invention, the end 5b of each rod 5a can be in a single piece with the plate 4d described above.

Moreover, between the ends 5b of each rod 5a and a respective plate 4d a boss or mask element 5f can be provided (fixed or fixable to the rod 5a and the plate 4d) having a size greater than the end 5b and the edge of the plate 4d and intended to cover and wrap part of the gap between the base component 2 and padding component 3 at the plate 4d, when the base component 2 and the padding component 3 are assembled to each other.

Figure 2:
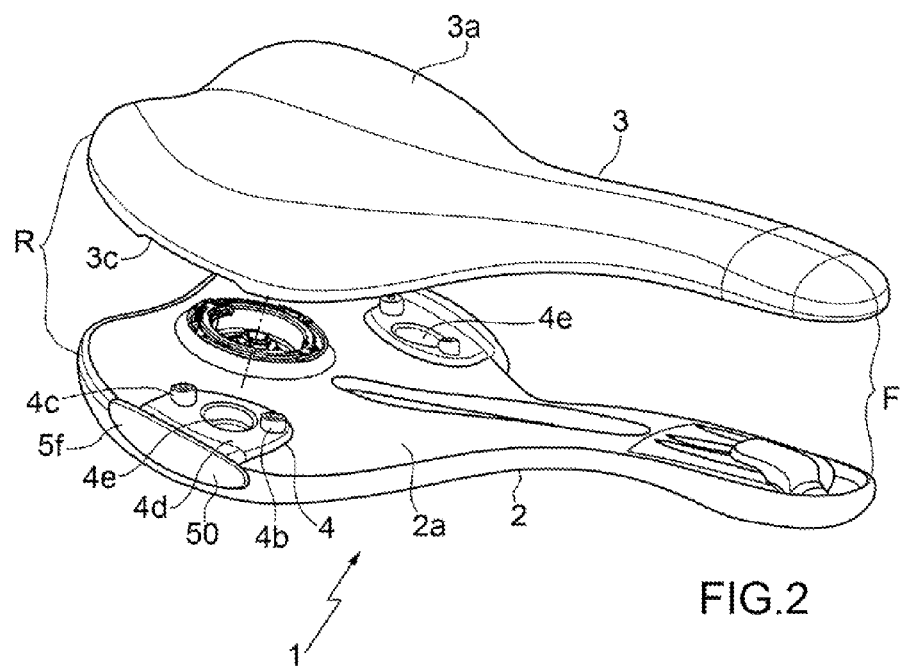
FIG. 2 is a view of a saddle similar to that of FIG. 1 but without a fitting.
Figure 3:
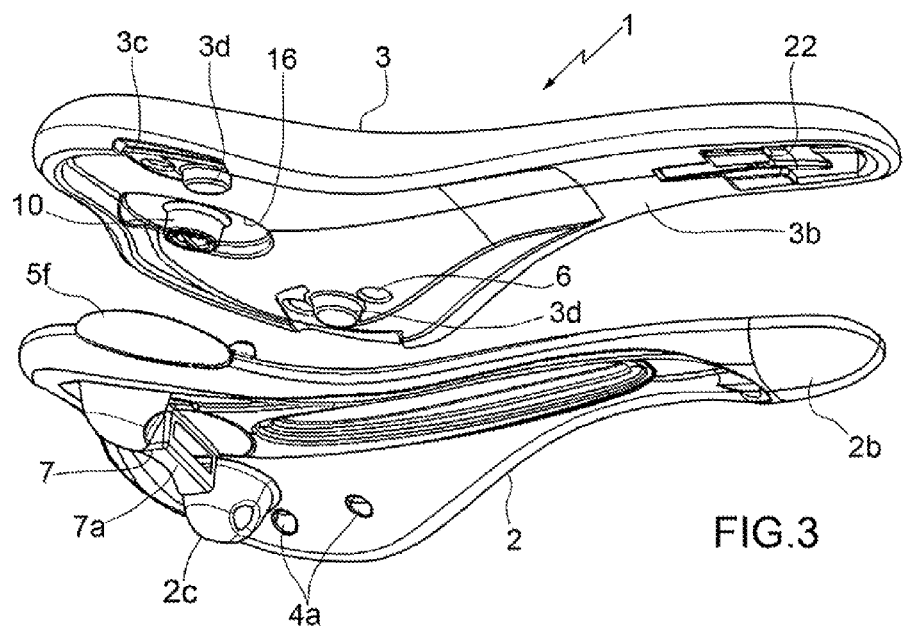
FIG. 3 is an exploded perspective view slightly from below of the components of the saddle of FIG. 2.
Figure 4:
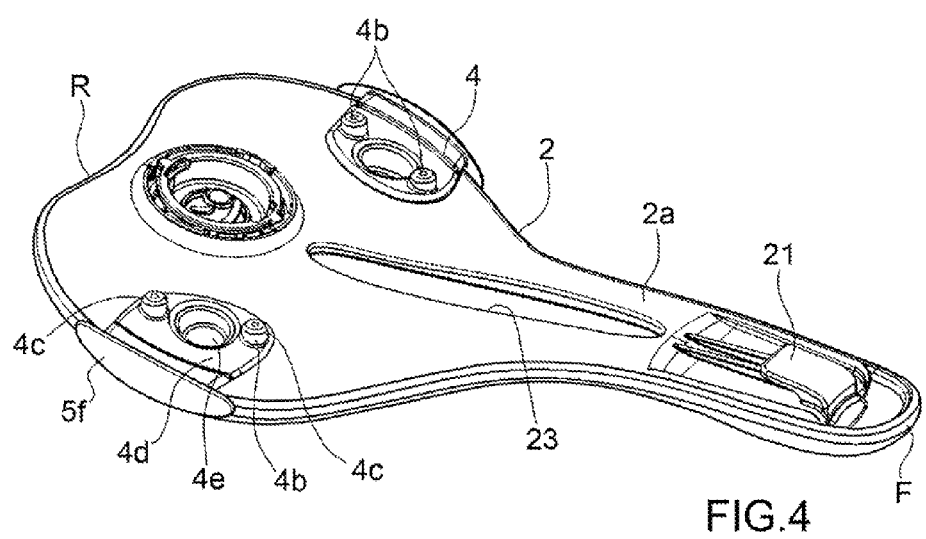
FIG. 4 is a perspective view slightly from above of a base component or body of the saddle of FIG. 2.
Figure 5:
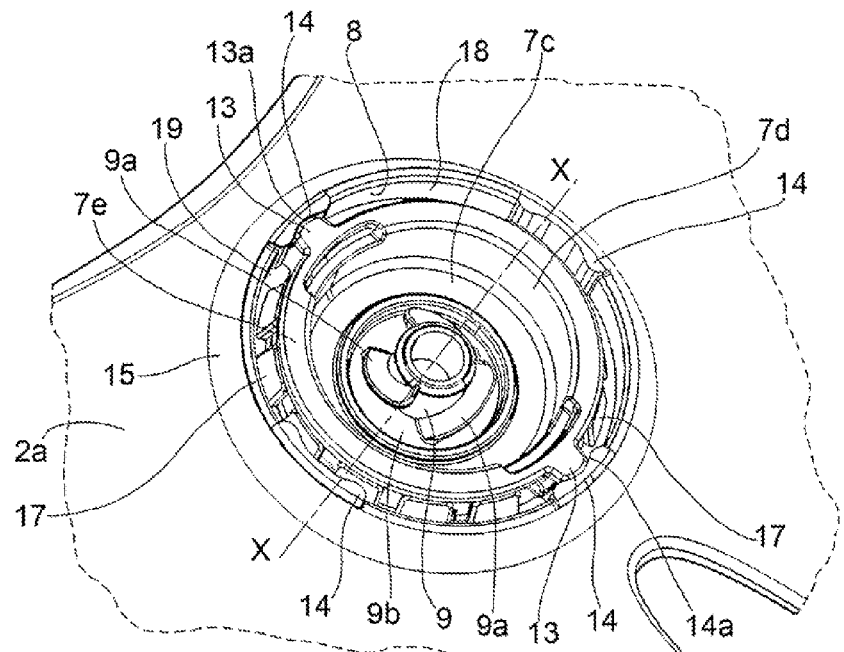
FIG. 5 is a detail in enlarged scale of FIG. 4.

According to a variant (see FIGS. 2 to 4), the fitting comprises a (side) protection component 50 from which a respective plate 4d extends, optionally transversely, entirely similar to that described above with reference to FIG. 1. With reference to the specific non-limiting embodiment illustrated in the Figures, the support element comprises two protection components 50 placed one on one side and the other on an opposite side of the support element.

Figure 7:
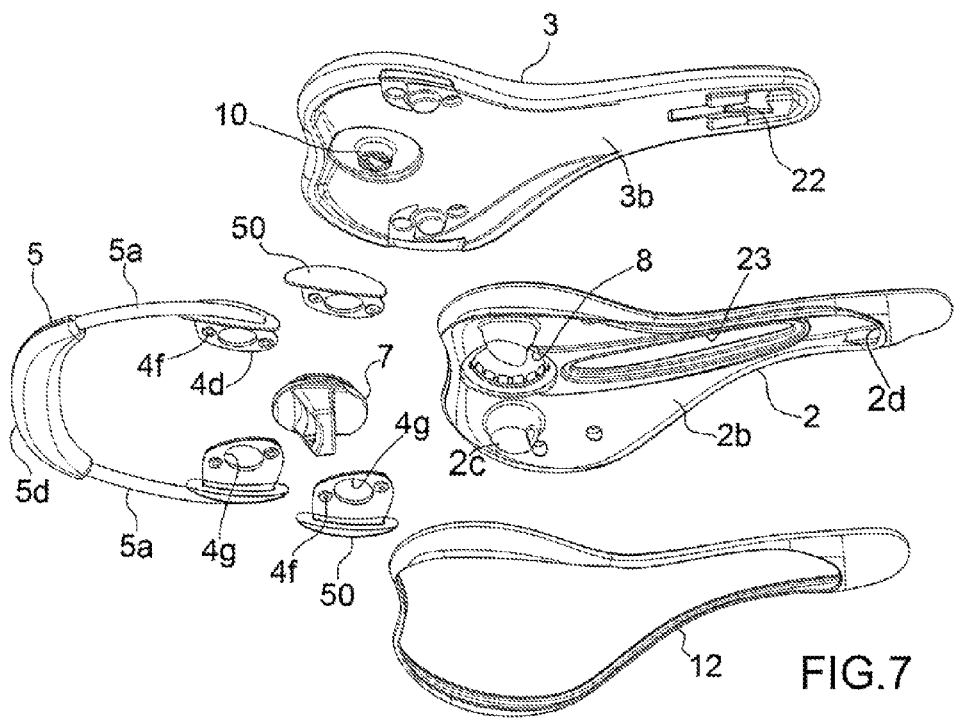
FIGS. 7 and 8 are perspective views slightly from below and exploded of respective variants of support element according to the present invention.
Figure 8:
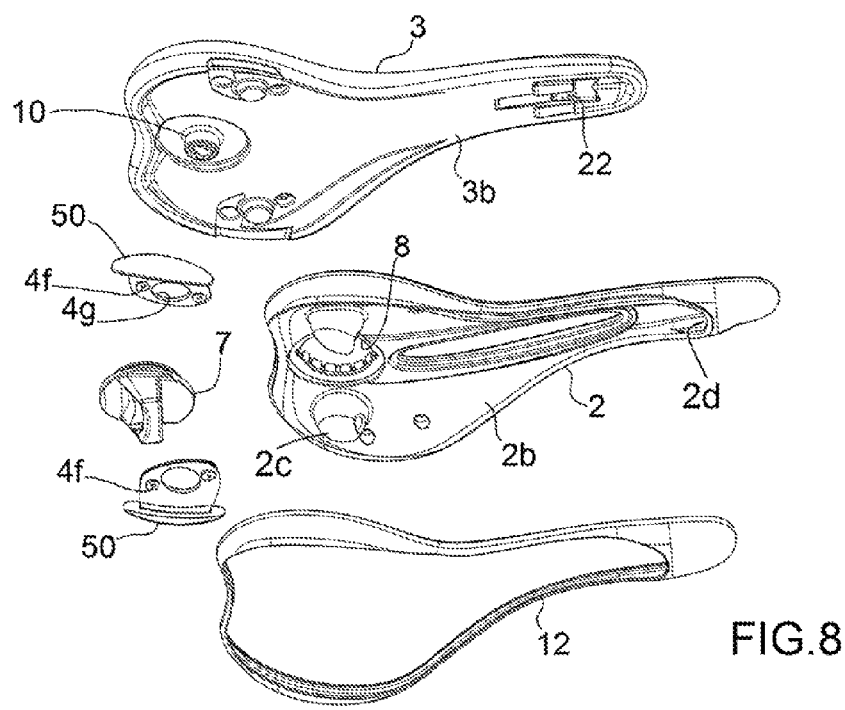
Figure 9:
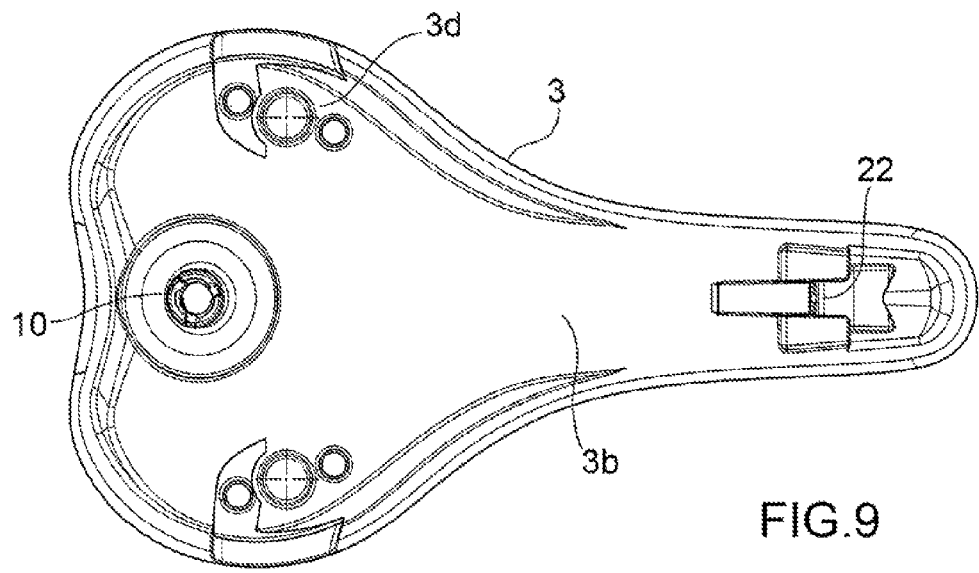
FIGS. 9 and 10 are, respectively, a plan view and perspective view slightly from below of a padding component according to the present invention.
Figure 10:
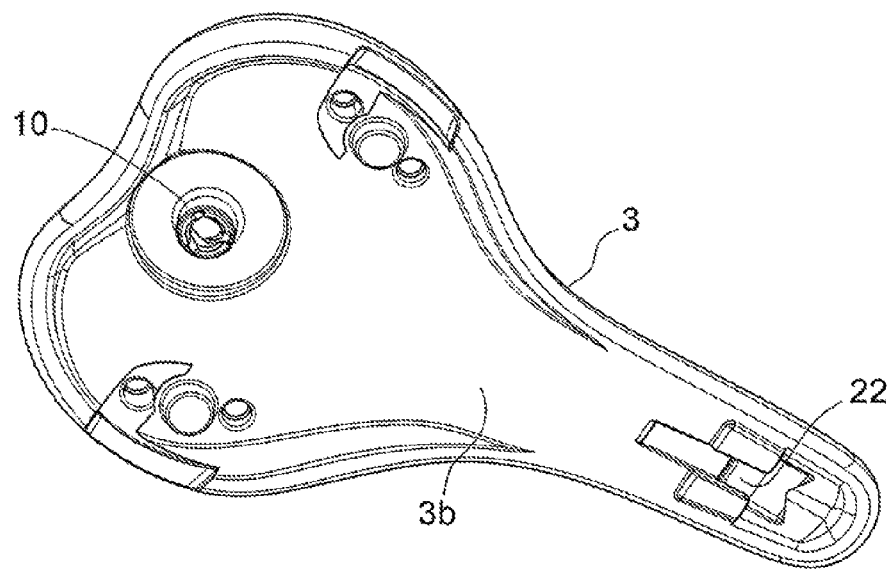
Figure 11:
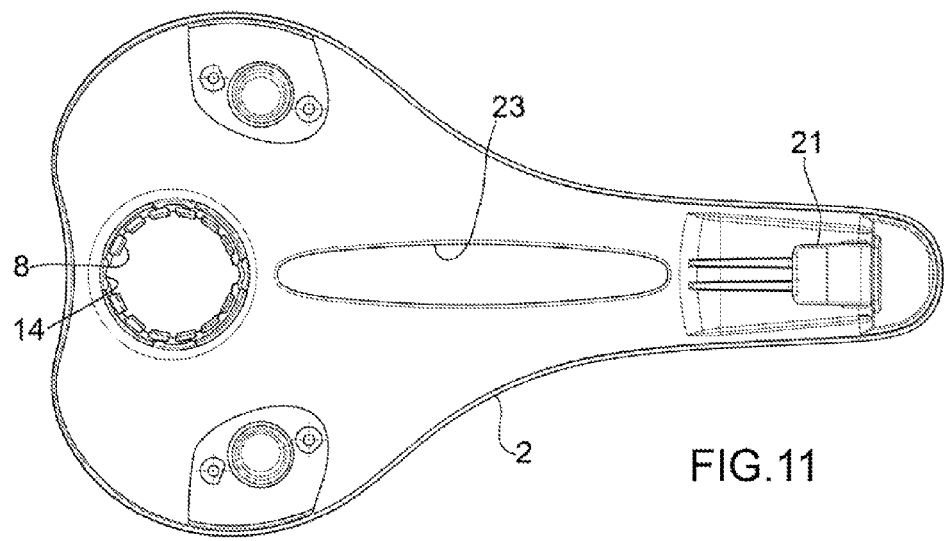
FIGS. 11 and 12 are, respectively, a plan view and perspective view slightly from above of a base component of a support element according to the present invention.
Figure 12:
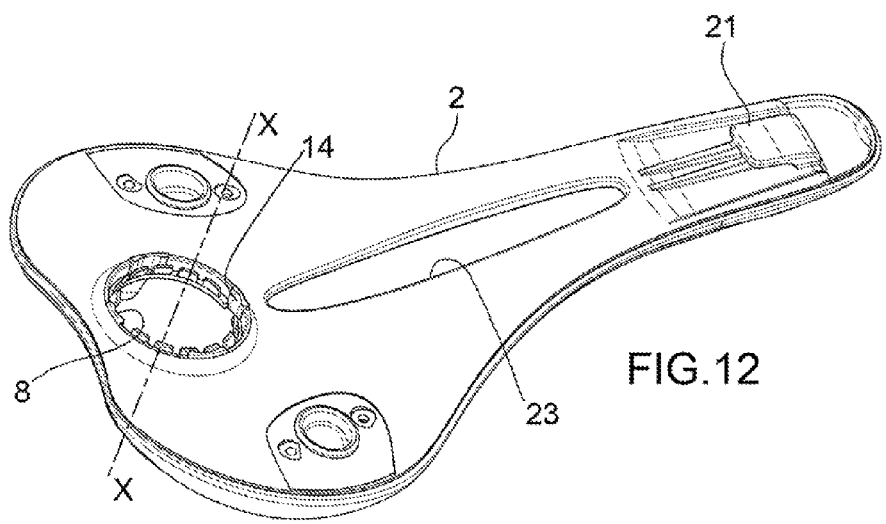
Figure 13:
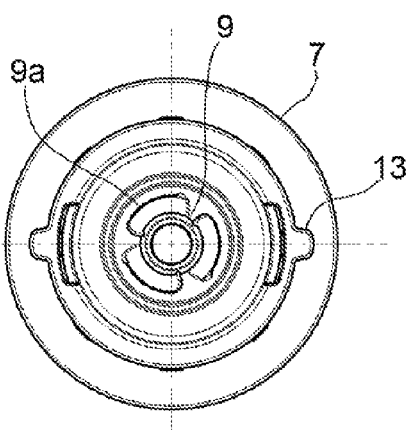
FIGS. 13 to 16 are respectively, plan, perspective, side and front views of a mobile or key component of a support element according to the present invention.
Figure 14:
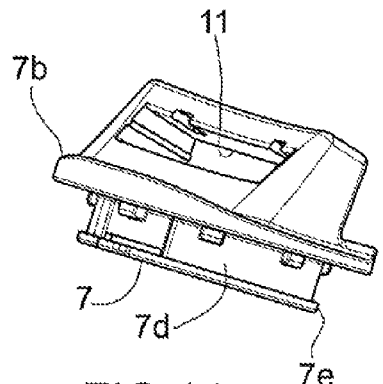
Figure 15:
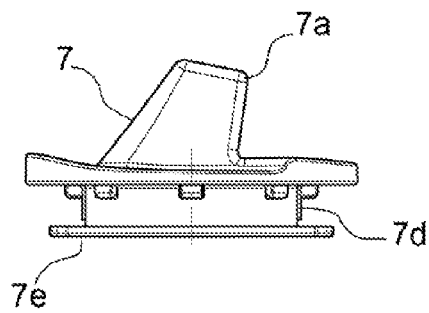
Figure 16:
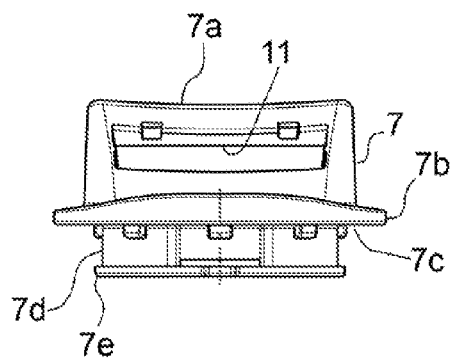
Figure 17:
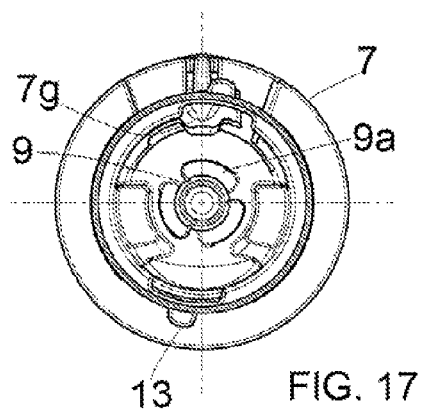
FIG. 17 is a bottom view of a detail of another embodiment of support element according to the present invention.
Figure 18:
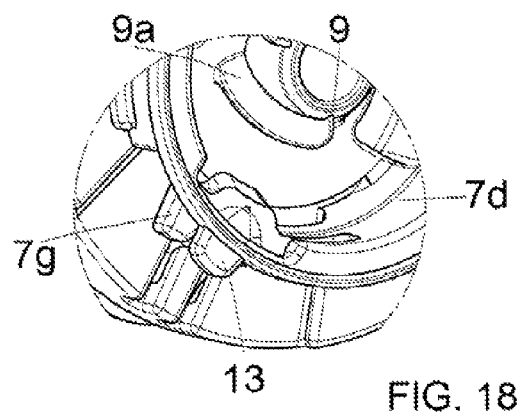
FIG. 18 is a detail of FIG. 17.
Figure 19:
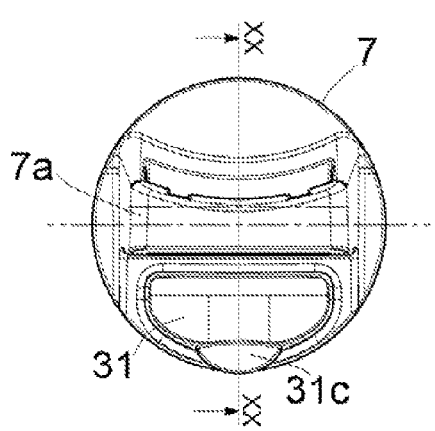
FIG. 19 is a top view of the detail of FIG. 17.
Figure 20:
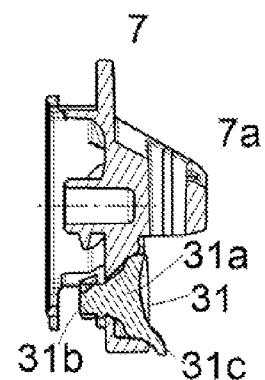
FIG. 20 is a sectional view along the line XX-XX of FIG. 19.
Figure 21:
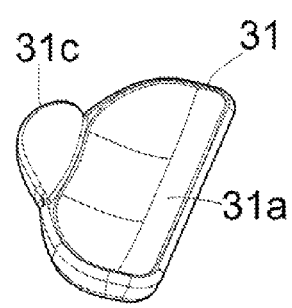
FIGS. 21 and 22 are top and bottom perspective views, respectively, of a locking/unlocking means of FIG. 17.
Figure 23:
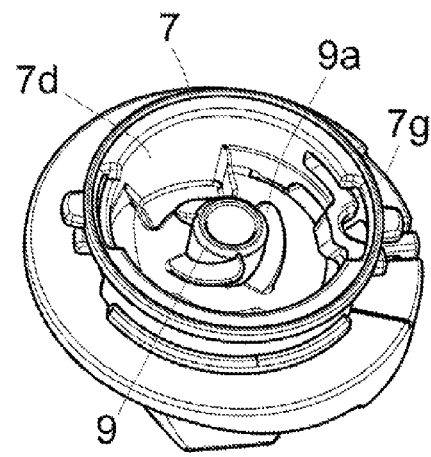
FIGS. 23 and 24 are top and bottom perspective views, respectively, of the key component of FIG. 17.
Figure 22:
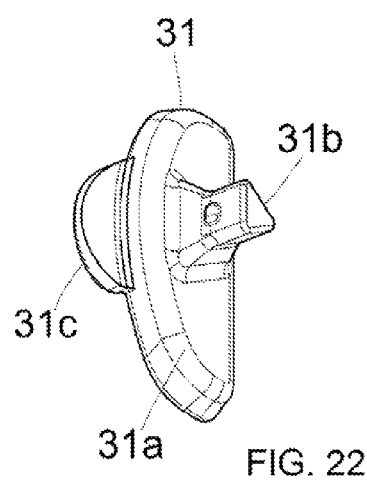
Figure 24:
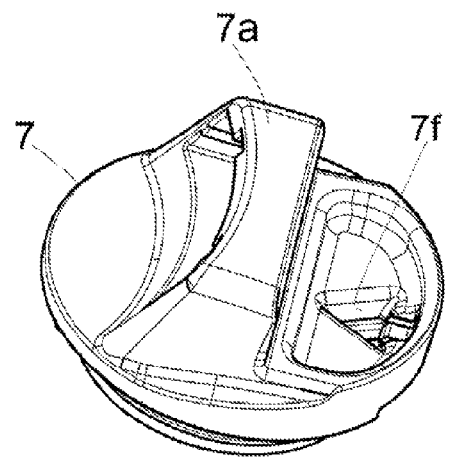

With reference then to FIG. 7 a support element provided with multiple fittings is illustrated, for example a handle 5 and protection components 50 fixed as indicated above. In this regard, optionally, each protection component 50 can be fixed through the same engagement holes 4a and the same bolts 4b of the handle 5.

For a correct and rapid positioning of the or each plate 4d on the base component 2, a notch or groove can be provided, in the base component 2, in which a relief portion 4e of the plate 4d is insertable, for example fit insertable. Alternatively, the plate 4d can comprise an opening 4g (see in particular FIGS. 7 and 8) alignable with a recessed portion of the base component 2 or padding component 3.

In the padding component 3, one or more lowered areas 3c can instead be delimited for shape-coupling and for receiving a respective plate 4d, when the base component 2 and the padding component 3 are assembled. When the or each plate 4d then comprises a relief portion 4e or a recessed portion is provided as stated above, then from the padding component 3 block components 3d can project intended to be inserted and shape-engaged with a respective recessed or lowered portion 4e of a plate 4d or recessed portions of the component 2 or 3 when the base component 2 and padding component 3 are assembled.

Moreover, the block components 3d, if the same are provided, beyond having the role of centering the padding component 3 to the base component 2, can provide even increased stability to the whole of the support element, thus preventing mutual longitudinal translations of the two components 2 and 3.

Naturally, as it will be understood, as also stated above, the first engagement openings 4a can be formed in the padding component 3 for constraining the fitting 5 or 50 thereto, for example rods 5a, optionally by means of a plate 4d as stated. In this case, the lowered area/s 3c, the housing seat/s 6 and the recessed or lowered portion/s 4e can be formed in the base component or body 2 or extending from the same.

As it will be understood, a fitting could be constrained to the base component 2 and to the padding component 3 with engagement means acting between such components 2, 3 or better between the respective upper 2a and lower 3b surface also in another way, for example an end of a fitting or of a rod thereof could be placed between the base component 2 and the padding component 3 to then block the fitting 5 in position by tightening such components 2, 3 with each other. In this regard, the end of the fitting could be shaped so as to shape-engage with respective parts of the base component 2 and/or of the padding component 3; optionally, the fitting could have an end with a protuberance or with a hole intended to shape-engage, respectively, with a slot or with a projecting portion of the base component 2 and/or padding component 3.

It should also be noted that the padding component may be collapsible, particularly in the area of connection between the base component 2 and padding component 3, and substantially for the height or thickness of receiving an optional fitting, so that even if no fittings are provided, a suitable and substantially complementary coupling between the base component 2 and padding component 3 is guaranteed. Thanks to this expedient, it is possible to prevent that, once the saddle has been assembled with no fittings, chinks are visible at the points of connection of the latter, which chinks, as it will be understood, would result in a noticeable unsightly effect.

The support element (see in particular FIGS. 7 and 8) can also comprise a cover or frame component 12, for example made of rigid plastic or similar materials, intended to wrap and cover, in use, the rail and part of the base component 2.

Figure 6:
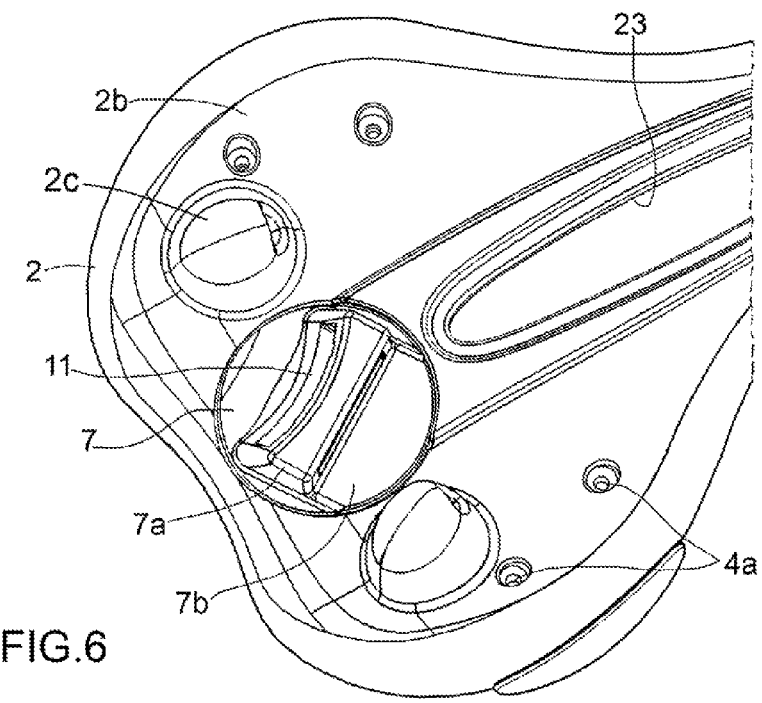
FIG. 6 is a perspective view slightly from below of a detail of the base component or body of FIG. 4.

With regard to the removable anchoring means of the base component 2 to the padding component 3, they preferably include a gripping or grasping portion 7a extending outside with or engageable from the outside of the area between the base component 2 and the padding component 3, for example at the lower surface 2b of the base component 2 or the upper surface 3a of the padding component 3, so as to allow a manual displacement of the removable anchoring means between at least one rest position (see for example FIG. 6), wherein the base component 2 and the padding component are released or releasable and at least one work position (see for example FIG. 3), wherein the base component 2 and the padding component 3 are firmly anchored to each other. Due to the presence of the gripping or grasping portion 7a, an operator or a user can therefore actuate the removable anchoring means without the need of tools, such as screwdrivers or the like.

Moreover, the removable anchoring means, as will be better stated in the following, can comprise one or more quick attachment structures or ICS.

Preferably, the removable anchoring means comprise:
a mobile or key component 7 mountable, for example rotatably mounted, in an anchoring opening 8, for example about an axis of symmetry x-x of the opening 8, which opening is obtained in the base component 2 or in the padding component 3; the key component 7 can also have first constraining means 9 that extend in the area between base component 2 and padding component 3, and second constraining means 10 in the other between the padding component 3 and base component 2, intended to engage with the first constraining means 9 when the key component 7 is inserted in the respective anchoring opening 8 and the base component 2 is taken into engagement with the padding component 3.

In this regard, the removable anchoring means can comprise bayonet anchoring means.

As it will be understood, the key component 7 could also be inserted along a longitudinal axis x-x of the opening 8 and therefore not being rotatable about the axis x-x. In such case, the key component 7 could have control means, for example pliers or the like, intended to control the displacement of corresponding first constraining means that extend in a portion insertable in the anchoring opening 8 formed in the base component 2 or in the padding component 3 and intended to engage with corresponding second constraining means, in the other between padding component 3 or base component 2.

The first constraining means can, for example, comprise a tang or bushing 9 from which a plurality of tabs 9a extends, circumferentially spaced with one another and of helical form from one edge of the tang 9 to the other. The second constraining means can include a sleeve element 10 from which respective teeth or protuberances extend or grooves are formed, intended to engage, possibly like a bayonet, with the tabs 9a. The tabs 9a and the teeth or protuberances are, preferably, elastically yieldable.

Preferably, both the tang 9 and the sleeve 10 comprise a tubular element with longitudinal axis corresponding to the axis x-x, when the support element is assembled.

The key component 7 can comprise, moreover, a quick attachment structure or ICS. In this regard, the key component 7 can include a body or main plate 7b, optionally substantially flat, starting from an inner, in use, surface from which (main plate 7b) the first constraining means 9 extend, while from the other outer, in use, surface thereof, the gripping portion 7a projects, which gripping portion can comprise a bridge element delimiting an opening, preferably a through opening 11, which can act as the female part of an ICS.

The main body 7b of the key component 7 is anchorable in position, for example by connection means 13, 14 in the anchoring opening 8 of the base component 2 or padding component 3.

The connection means 13, 14 are, for example, snap connection means.

The connection means can comprise one or more (two in the drawings) lugs 13 extending from an outer wall or edge of the key component 7 intended to engage respective recessed or cradle-like sections 14 (four in the drawings) delimited at the opening 8.

More in particular, for example four recessed sections 14 can be provided that are angularly spaced, for example by 90° from each other, and two angularly spaced lugs 13, for example by 180°, and intended to engage with respective recessed sections 14, so that the key component can be fixed to the base component 2 or padding component 3 in several operating positions, for example one working position and one rest position.

The main body 7b of the mobile component 7 can be for example configured like a solid of rotation around a symmetry axis, axis which in assembly position is substantially coinciding with the axis x-x; in this case the main body 7b can also have from one outermost, in use, side to the other innermost, in use, side, a base, for example annular, wall 7c, and delimiting a hole or opening for inserting a block 9b from which the first constraining means 9 are extended, then a substantially cylindrical wall 7d extending from an outer edge of the base wall 7c and ending with a flanged section 7e, the lugs 13 extending from an outer edge thereof.

The base wall 7c can, as stated above, delimit an internally threaded hole or opening for the engagement with an externally threaded portion of the block 9b. Naturally, the block 9b could be integral with the main body 7b or it could be anchored in the main body 7b in another manner, for example through snap coupling means or by means of fit insertion, etc.

The gripping portion 7a, if present, can extend starting from an outer, in use, surface of the base wall 7c and in a direction opposite to the cylindrical wall 7d.

In a version of the invention, from the upper surface 2a of the base component 2 or lower surface 3b of the padding component 3 in which the opening 8 is formed or delimited for positioning the key component 7, preferably around the anchoring opening 8, a section of tubular wall 15 extends, for example slightly frustoconical, intended to shape-engage with a recessed seat 16 obtained on the other between the padding component 3 and the base component 2.

Still starting from the upper surface of the base component 2 or from the lower surface of the padding component 3, in which the opening 8 is formed or delimited for positioning the key component 7, towards the inside of the area between the base component 2 and the padding component 3, a plurality of angularly spaced stop teeth 17 extends intended to engage the mobile component 7 allowing it to rotate around the axis x-x, while preventing its disengagement or disassembly from the base component 2 or padding component 3.

More in particular, the anchoring opening 8 comprises from an inner side to an outer side of the respective base component 2 or padding component 3, a substantially cylindrical section 18, optionally delimited by the tubular wall 15 and in which the recessed or cradle-like sections 14 can be obtained, then a transverse wall 19 starting from which the stop teeth 17 can be extended, which can be slightly tilted with respect to the axis x-x. In this regard, the stop teeth have, for example, an end far from the axis x-x that is constrained to the transverse wall 19 and a free end close or proximal to the axis x-x. The free end of the stop teeth 17 is substantially flush or aligned with, in a plane transverse or orthogonal to the axis x-x, the recessed sections 14. Moreover, the recessed sections 14 can be delimited by two radially enlarged portions 14a relative to the respective substantially cylindrical section 18.

Preferably one or more circumference sections are provided about the axis x-x without stop teeth, which section/s correspond/s to the development sections of the recessed sections 14 intended to receive one or more respective lugs 13, when the mobile component is in the work position in which the base component 2 and the padding component 3 are stably anchored.

The stop teeth 17 or better the respective free ends are aligned along a circumference with smaller radius than the diameter of the flanged section 7e and, optionally, than the distance between the lugs 13 or between the free ends 13a of the latter. Due to such configuration, when the mobile component 7 is assembled with the respective base component 2 or padding component 3, then the stop teeth 17 will allow the rotation of the mobile component 7, but not the exit of the same from the opening 8.

The opening 8, delimited by the base component 2 or the padding component 3 and intended to house or engage with the key component 7, can be delimited in a rear area of the support element 1 and, especially when the latter comprises a saddle, at the substantially enlarged rear area of the latter.

The support element can also comprise at least one tongue 21 projecting towards the front F or the rear R of the support element from the lower surface 3b of the padding component 3 or from the upper surface 2a of the base component 2, the tongue 21 being engageable with a seat 22 formed in the other between the upper surface 2a of the base component 2 and the lower surface 3b of the padding component 3 by relative sliding between the base component 2 and the padding component 3. In the event that the support element comprises a saddle, the tongue/s 21 and the respective seats 22 are obtained at the tapered front part of the base component 2 and of the padding component 3.

A longitudinal through groove 23 can also be obtained in the base component 2, and at an intermediate portion thereof.

Optionally, the support element can be provided with safety locking/unlocking means of the removable anchoring means in work position. Such safety locking/unlocking means could, for example, comprise a pin or a plug insertable into the quick attachment structure and into one of the components of the support element.

With particular reference to the non-limiting embodiment illustrated in FIGS. 17 to 24, the locking/unlocking means 31 comprise a base plate 31a from which a pin or plug 31b extends that can be inserted within a seat 7f formed in the key component 7 and intended to move a foil portion 7g, for example an elastic, optionally curved portion, of the key component 7 from a locking position to an unlocking position. The foil portion 7g can extend from the substantially cylindrical wall 7d and have a tip or end slidably mounted within a window obtained in the same. Essentially, once the locking/unlocking means 31 is installed or inserted, it presses or displaces the foil portion 7g so as to bring back the tip or free end of the same from an intermediate area between the stop teeth 17 or in any case in engagement against the walls of the opening 8, towards and inside a respective window formed in the substantially cylindrical wall 7d, so that it is possible to rotate the key component 7 from the work position to the rest position. If the locking/unlocking means is removed, instead, then the foil 7g is snapped in stop position and the respective tip is inserted between the stop teeth 17 or in any case is abutted and engages the opening walls 8, in which position the key component 7 cannot rotate from the work position into the rest position, and, therefore, it is not possible to release the base component 2 and the padding component 3. Naturally, the base component 2 and the padding component 3 can be fixed or connected to each other even if the locking/unlocking means are not engaged or inserted.

The locking means 31 can moreover also comprise a handle portion 31c extending from a face of the base plate 31a opposite that from which the pin or plug 31b extends.

For the assembly of a support element 1, for example a saddle, according to the present invention, the upper surface 2a of the base component 2 and the lower surface 3b of the padding component 3 are brought in abutment alignment or in contact, for example in substantial parallelism, and then the removable anchoring means are actuated, so as to removably anchor the base component 2 and the padding component 3. The removable anchoring is preferably carried out manually.

If provided, one or more fittings 5 or 50, these can be fixed as stated above through engagement means acting or operating between base component 2 and padding component 3. In this case, before the abutment or contact alignment of the base component 2 and the padding component 3, if provided, the plate/s 4d are fixed, optionally by means of screwing, to the base component 2 or the padding component 3, for example through bolts or screws 4b or by another means.

With reference then to the removable anchoring means, if provided, the mobile component 7, once the base component 2 and the padding component 3 are brought in contact or in associated operative position, the mobile component 7 is actuated, for example by rotating it and for example by acting manually on the gripping portion 7a, about the axis x-x. Alternatively, the key component 7 could be longitudinally inserted in the opening 8 along the axis x-x.

Moreover, the key component 7 can be mounted in the anchoring opening 8 before the abutment of the base component 2 and the padding component 3. In this regard, the key component 7 could be inserted inside the opening 8 from the outer side of the base component 2 or padding component 3, optionally from the lower surface 2b of the base component 2 or from the upper surface 3a of the padding component 3, to then project or to be engageable by the other surface, that is to say by the upper surface 2a of the base component 2 or lower surface 3b of the padding component 3.

During such steps, when the key component 7 and the anchoring opening 8 are made as stated above, the key component 7 is first inserted into the opening 8 with lug/s 13 angularly offset relative to the respective cradle-like portion 14. At this point, once the base component 2 and the padding component 3 have been assembled, bringing the respective surfaces 2a and 3b in abutment, the operator or user in order to removably anchor such components 2, 3, acts from the outside on the mobile component 7, for example on the gripping portion 7a, driving the rotation of the mobile component 7, the engagement between the first 9 and second constraining means 10 and the angular displacement of the lug/s 13 until reaching a respective cradle-like portion 14 and being inserted into the same.

Moreover, before these steps, when in one between the base component 2 and the padding component 3 one or more tongues 21 are provided for the sliding engagement with a seat 22 formed in the other between base component 2 and padding component 3, each tongue 21 is first inserted in the respective seat 22 and then the remaining part (for example the rear R) of the upper surface 2a of the base component 2 is brought in abutment with the lower surface 3b of the padding component 3.

Figure 25:
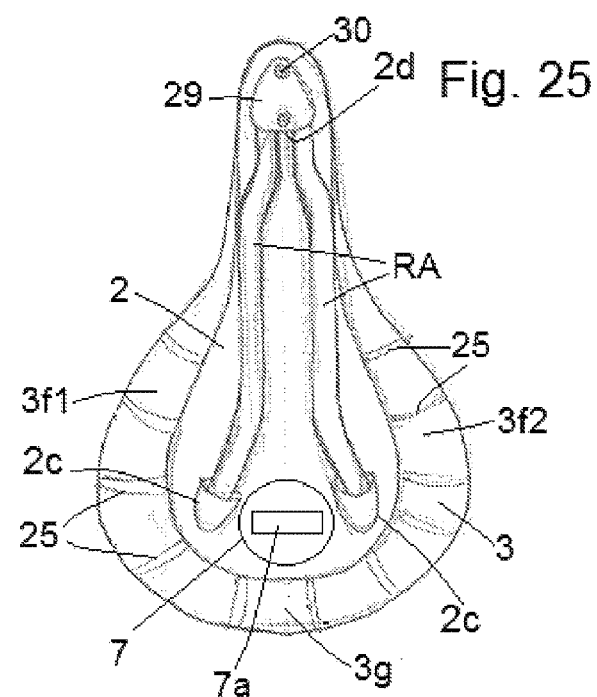
FIG. 25 is a bottom view of a support element according to the present invention.
Figure 26:
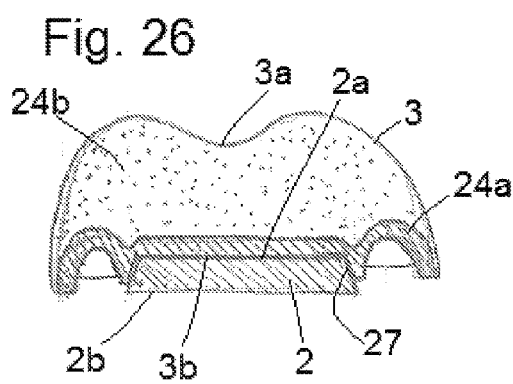
FIG. 26 is a cross sectional view of the support element of FIG. 25.
Figure 27:
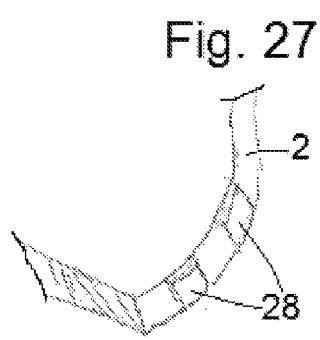
FIG. 27 is a view of a detail of a component of the support element of FIG. 25.

A support element according to the present invention can then comprise a base component 2 that has a structure and a configuration such as to be able to be used in combination with and constrained to multiple padding components 3 different from each other, in particular with different size and/or form, see in particular FIGS. 25 to 27.

Due to this expedient, a standard base component 2, for example, can be provided on which all or many types of padding can be constrained, so that it is possible to obtain any type of support element, in particular a saddle, that is to say with all the types of padding desired, starting from a same base component 2.

According to the present invention a kit for the realization of a support element as indicated above is then also proposed, which kit comprises at least one base component 2 as well as two or more padding components 3 having a form or size different from each other, each padding component being provided with removable anchoring means for removably anchoring to the base component 2.

In this regard, the padding component 3 can project laterally and/or on the rear and/or on the front with respect to the base component 2, and, advantageously, the lower, in use, surface 3b of the padding component 3 is larger and extends beyond the upper, in use, surface 2a of the base component 2. In this case, the engagement means will advantageously be obtained at a central or intermediate area of the padding component 3, so that it is possible to removably anchor the base component 2 and the padding component 3, with the padding component 3 of greater width or in any case projecting with respect to the base component.

According to the embodiment illustrated in the FIGS. 25-27, the lower, in use, surface 3b of the padding component 3 can be larger and then extend beyond the upper, in use, surface 2a of the base component 2 both at sections 3f1, 3f2 on the sides and at sections 3g at the rear of the padding component 3. The lower surface 3b of the padding component 3 can, optionally, have a C-shaped configuration in cross-section, in particular at the section or sections 3f1, 3f2, 3g thereof projecting, in use, with respect to the base component 2, so as to make it self-bearing or self-supporting.

Moreover, as stated above, the padding component 3 can comprise a base made of rigid material or first rigid support layer 24a, in use, lower and delimiting the lower surface 3b of the padding component 3, as well as a second soft layer 24b, optionally made of foam, connected to the first layer 24a and intended to delimit, at the free face thereof, the upper surface 3a of the padding component 3 that, in use, comes in contact with the user. The second soft layer 24b can, for example, be molded, optionally injection-molded or cast-molded, or glued onto the first rigid layer 24a or vice versa.

The first rigid layer 24a can be made of a material selected from the group consisting of thermoplastic polymers and thermosetting polymers, while the second soft layer 24b can be made of a material selected from the group consisting of thermoplastic rubbers, expanded polyurethane and gel.

The supporting first rigid layer 24a can comprise a plurality of ribs 25, which serve to strengthen or stiffen the support element 2, this in particular at the sections 3f1, 3f2 and 3g of the padding component 3.

The base component 2 or the padding component 3 can then be configured so as to be at least in part and preferably completely fit housable or positionable in a seat or recessed portion 27, optionally tapered inwardly, delimited by the other between the padding component 3 or base component 2.

Moreover, at the seat or recessed portion 27 as well as at the base component 2 or the padding component 3 housed therein, optionally on one or more of the side walls thereof, connecting means can be formed, optionally sliding connecting means, for the base 2 and padding component 3. The connecting means can comprise one or more bosses or protrusions 28, for example having a partially conical or frustoconical configuration extending from the edge or side wall of one between base component 2 or padding component 3, as well as one or more grooves formed in the other between padding component 3 or base component 2 or better in the recessed portion 27 formed therein, the protrusion/s 28 being intended to be fit inserted with each recessed portion.

Advantageously, the base component 2 comprises two or more elements slidably engaged with each other, so that they can be moved apart or closer, thereby increasing and decreasing the width of the base component 2. The elements of the base component 2 slidably engaged to each other, can be slidable on a horizontal, in use, plane, so as to determine the widening/narrowing of the support element and/or vertical plane, so as to determine the thickening of the support element or not. Due to this expedient, it is possible, among other things, to adapt the base component 2 to support padding components 3 of different size and/or form.

Advantageously, a support element according to the present invention can include, between the base component 2 and padding component 3, one or more intermediate layers, optionally made of rubber or similar material, intended to be partially extended around the facing free edge of one or both the same, so as to enclose or conceal the space or gap between the edge of the upper surface 2a of the base component 2 and that of the lower surface 3b of the padding component 3, as well as to dampen the vibrations and reduce the noise deriving from the relative displacement of such components 2, 3. As it will be understood, in fact, the base component 2 and the padding component 3 are usually made of plastic or similar material and the relative displacement of the same, for example during a push on a pedal, when the support element is a bicycle saddle, might give raise to creaking. The intermediate layer described above would thus ensure advantages from both an aesthetic and functional point of view.

The tip or tips of the rail RA could then be fixed also between the base component 2 and a plate 29 or the like fixed to the base component through screws 30. This solution allows deformations of the components of the support element to be avoided following the insertion of the rail RA.

As it will be understood, a support element according to the present invention allows constraining in a rapid, easy and stable manner an interchangeable padding element or one or more fittings.

Moreover, a support element according to the present invention allows the base component and padding component to be removably anchored, it being possible to constrain and release them by manual operations, without the need of tools, for example screwdrivers, and also in a rapid manner, while still providing a reliable anchoring.

This allows, among other things, a user to easily release and bring with himself/herself the padding component without base component, whenever he/she so wishes, this being advantageous in particular when the support element is a saddle, in which case the user (cyclist) can detach the padding from the base, and hence from the bicycle, every time he/she parks his/her vehicle, so as to limit, as far as possible, possible thefts of the bicycle or the saddle.

In the particular case in which a support element according to the present invention comprises one or more standard base components for multiple paddings, the user can, once the base component 2 has been purchased, decide to use the desired padding component 3, hence with preferred size, height and configuration.

This ensures clear advantages, including also from an environmental point of view, taking into account that the padding component is the component subject to greater wear and once the same is definitively damaged and no longer usable, the user can eliminate it and replace it with a new one, yet keeping the same base component, thus reducing the elements to be eliminated and disposed of. Moreover, as it will be understood, due to the provision of removable anchoring means, the padding component can be disposed of in an easier and cheaper manner as compared to the previous solutions.

Another advantage deriving from the use of a base component as above consists in the fact that the user can realize a support element that meets his/her aesthetic or functional desires, for example of comfort and form of the padding.

Moreover, productive advantages are obtained since, as far as the base component is concerned, it is possible to provide a single productive line, avoiding the need to have differentiated productive lines for the various types of saddle, each provided with a different base component or body.

Moreover, starting from one or at most two base components 2 it is possible to realize virtually all types of saddles, for example of racing type, of so-called "athletic" type, of leisure type or in any case of the so-called "moderate relaxed" type.

Preferably, the two types of standard base component could be one provided with connection elements for a fork or rail and without shock absorbing elements and the other adapted to fix shock absorbing elements, such as springs, for example cup-like or helical, elastomers or the like also optionally interposed between a fork or rail and the respective base component.

Modifications and variants of the invention are possible within the scope of protection defined by the claims.

The invention claimed is:

1. A saddle for a vehicle, a bicycle or a motorcycle comprising a padding component and a base component or body, said base component comprising an upper, in use, surface, as well as a lower, in use, surface, said padding component comprises an upper, in use, surface, and a lower, in use, surface designed to engage said upper, in use, surface of said base component, further comprising anchoring means of said base component to said padding component, further comprising engagement means engaging at least one fitting to said base component or to said padding component, said engagement means engaging said at least one fitting in an area between said upper surface of said base component and said lower surface of said padding component, wherein said at least one fitting comprises at least one of a rod component, stem component or protruding portion,
   wherein said at least one of said rod component, stem component or protruding portion has a first end engageable through said engagement means, and a second end extending outside of a periphery of the support element.

2. The saddle according to claim 1, wherein said engagement means comprise at least one first hole or engagement opening formed in said base component or in said padding component and also comprise at least one screw, bolt or coupling element engageable in said respective first hole or engagement opening, thereby fixing said fitting to said base component or to said padding component.

3. The saddle according to claim 2, further comprising at least one housing seat in said padding component or in said base component and in that said at least one screw, bolt or coupling element comprises a head and a longitudinal development body, said longitudinal development body being, in use, removably insertable into a respective first hole or engagement opening, whereas said head is houseable in a respective housing seat.

4. The saddle according to claim 1, wherein at least said second end extends outside of the area between said upper, in use, surface of said base component and said lower, in use, surface of said padding component.

5. The saddle according to claim 4, wherein said first end is fixed to or integral with a plate wherein at least one second engagement opening is provided, said second engagement opening being intended to be aligned with a respective first hole or engagement opening in said base component or padding component, at least one screw, bolt or coupling element being inserted in a respective first and second aligned engagement opening, thereby fixing said at least one plate, and therefore said at least one fitting, to said base component or to said padding component.

6. The saddle according to claim 1, wherein said anchoring means of said base component to said padding component include a gripping portion extending outside of the area between said base component and said padding component, said gripping portion being engageable from outside the area between said base component and said padding component, thereby allowing a manual displacement of said anchoring means between at least one rest position, wherein said base component and said padding component are released or releasable and at least one work position, wherein said base component and said padding component are firmly anchored to one another.

7. The saddle according to claim 1, wherein said anchoring means comprise:
at least one of a mobile or key component mountable in an anchoring opening obtained in said base component or in said padding component, said at least one of a mobile or key component having first constraining means that extend in the area between base component and padding component, and
second constraining means in the area between said padding component and said base component intended to engage with said first constraining means, when said mobile or key component is inserted in said anchoring opening and said base component is taken into engagement with said padding component.

8. The saddle according to claim 7, wherein said mobile or key component is rotatably mounted in said anchoring opening about an axis of symmetry of said anchoring opening.

9. The saddle according to claim 7, wherein said anchoring means comprise bayonet anchoring means.

10. The saddle according to claim 7, wherein said first constraining means comprise a tang from which a plurality of tabs extends, circumferentially spaced with one another, and said second constraining means include a sleeve element, from which respective teeth or protuberances extend or grooves are formed intended to engage with said tabs.

11. The saddle according to claim 7, wherein said at least one of a mobile or key component comprises a quick attachment structure.

12. The saddle according to claim 11, wherein said at least one of a mobile or key component comprises said gripping portion and said quick attachment structure is formed on said gripping portion.

13. The saddle according to claim 12, wherein said at least one of a mobile or key component comprises a body or main plate, said first constraining means projecting upwards from an inner, in use, surface of said body or main plate, whereas said gripping portion projecting from the other surface of said body or main plate, which is outer in use, said gripping portion comprising a bridge element delimiting a through opening intended to be a female part of a quick attachment structure.

14. The saddle according to claim 13, wherein said main body of said at least one of a mobile or key component is anchorable in position in said anchoring opening by connection means.

15. The saddle according to claim 1, wherein said anchoring means comprise a quick attachment structure.

16. The saddle according to claim 1, wherein from said upper surface of said base component or lower surface of said padding component wherein said anchoring opening is formed or delimited, a tubular wall section intended to shape-engage with a recessed seat, formed on the other between the padding component and base component, extends around said anchoring opening.

17. The saddle according to claim 1, wherein from the upper surface of said base component or lower surface of said padding component wherein said anchoring opening is formed or defined, a plurality of angularly spaced stop teeth intended to engage said mobile or key component, thereby allowing it to rotate around said axis (x-x) while preventing its disengagement or disassembly from the respective base component or padding component, extends towards the inside of the area between the base component and the padding component.

18. The saddle according to claim 1, further comprising at least one tongue projecting towards the front (F) or the rear (R) of said support element from the lower surface of said padding component or from the upper surface of said base component, said tongue being engageable with a seat formed in the other between the upper surface of said base component and the lower surface of said padding component by relative sliding between the base component and the padding component.

19. The saddle according to claim 1, wherein said base component has a structure and a configuration such as to be able to be used in combination with and constrained to a plurality of padding components different from each other in at least one of size and shape, so that it is possible to obtain different type of support elements starting from the same base component.

20. A kit for the realization of a saddle according to claim 19, further comprising at least one base component as well as at least two padding components having at least one of a shape and size different from each other, each padding component being provided with said anchoring means to said base component.

* * * * *